United States Patent [19]

Ryff

[11] 3,840,983
[45] Oct. 15, 1974

[54] METHOD OF MANUFACTURE OF A DYNAMOELECTRIC MACHINE LAMINATED ARMATURE STRUCTURE

[75] Inventor: Anthony S. Ryff, Saint Clair Shores, Mich.

[73] Assignee: Ford Motor Company, Dearborn, Mich.

[22] Filed: Apr. 30, 1973

[21] Appl. No.: 355,999

[52] U.S. Cl............... 29/598, 29/470.1, 29/472.3, 29/475, 29/609, 72/363, 310/217, 310/265
[51] Int. Cl. ........................................... H02k 15/02
[58] Field of Search .......... 29/596, 598, 609, 470.1, 29/472.3, 475; 72/363; 310/216, 217, 42, 261, 263–265

[56] References Cited
UNITED STATES PATENTS

| 829,015 | 8/1906 | Johnson | 310/263 |
| 2,243,318 | 5/1941 | Rawlings | 310/216 X |
| 2,490,021 | 12/1949 | Aske | 29/598 X |
| 3,417,272 | 12/1968 | Hoy | 310/261 |

Primary Examiner—Richard J. Herbst
Assistant Examiner—Carl E. Hall
Attorney, Agent, or Firm—Robert A. Benziger; Keith L. Zerschling

[57] ABSTRACT

A method of manufacture of a dynamoelectric machine laminated armature structure is disclosed wherein the lamina are compressively formed into a unitary structure by use of a ram and a suitably contoured die. The die provides that the finished diameter of the rotary structure will have closely controlled dimensions while the lamina themselves may be formed with relatively wide dimensional variations. By compressively confining the individual lamina under a pressure high enough to obtain some metal flowing, a unitary armature structure is provided.

4 Claims, 7 Drawing Figures

PATENTED OCT 15 1974
3,840,983
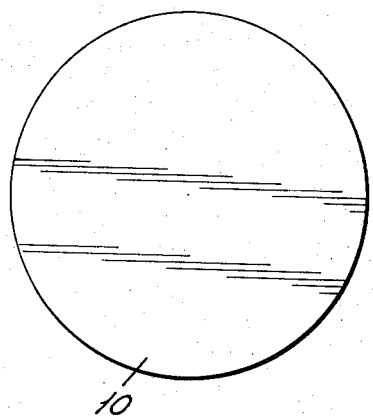
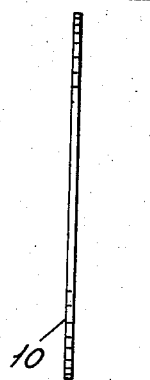
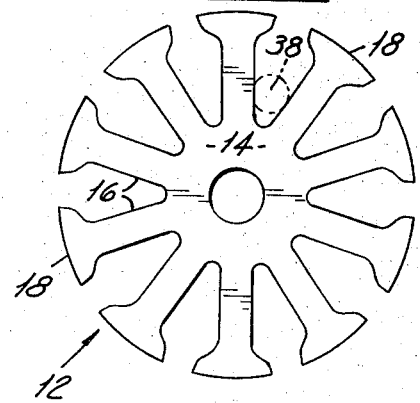
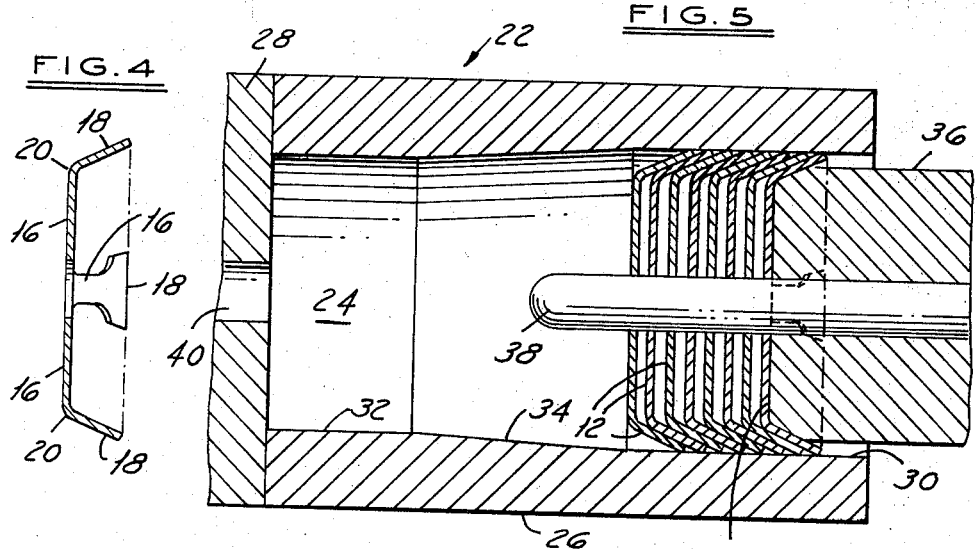
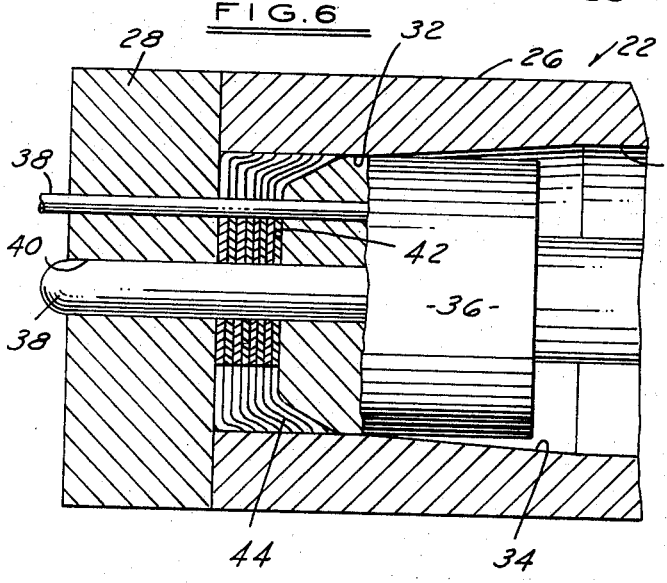
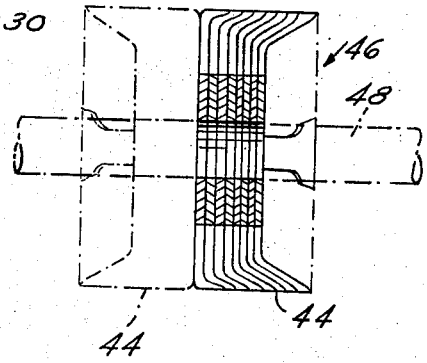

METHOD OF MANUFACTURE OF A DYNAMOELECTRIC MACHINE LAMINATED ARMATURE STRUCTURE

CROSS REFERENCE TO RELATED APPLICATION

This application is related to copending commonly assigned patent application Ser. No. 356,000 titled "Laminated Rotor Structure For A Dynamoelectric Machine" filed in the names of Anthony S. Ryff and Theodore W. Daykin on the same day as this application.

BACKGROUND OF THE INVENTION

1. Field of the Invention

The present invention is related to the field of dynamoelectric machines in general and in particular to that portion of the above noted field which is concerned with methods of assembly of laminated core structures for dynamoelectric machines. More particularly, the present invention is concerned with a method of assemblying a laminated dynamoelectric machine rotor or armature core having a larger axial length at the flux or air gap than is provided at the central region of the armature.

2. Description of the Prior Art

The prior art teaches that the individual lamina, which are to be assembled as the rotor or armature core of a dynamoelectric machine, be formed of a ferrous material with relatively accurate dimensions. This is required because the core structure is intended to be rotated, sometimes at very high speeds, and also to provide uniform flux gaps. The individual lamina are stacked to provide an axial length sized to produce a flux gap area commensurate with the desired motor performance and are fixedly attached to an armature shaft for rotation therewith. Such attachment may be by means of, for example, a compressively confining lock ring, a key and key way structure, or by welding. The individual lamina are usually bonded together by means of, for example, a very thin lacquer or epoxy coating. While this method is advantageous from the standpoint that it is usually readily automated it nevertheless suffers from the requirement that the initial size of the lamina, particularly the radial dimension, must be very accurately controlled since the structure is to be rotated and must therefore be balanced and the use of radial air gaps in dynamoelectric machines requires a highly uniform air gap at all rotary positions.

As set forth in the above noted companion patent application entitled "Laminated Rotor Structure For A Dnyamoeletric Machine," a rotor structure is disclosed which provides a substantially greater flux gathering or flux exchanging area at the radial air gap than prior art rotor or armature core structures having the same axial length at the central portion of the core. As set forth therein this improvement is obtained by providing each of the individual lamina with axially extending portions at the flux gathering or flux exchanging region so that when stacked in nesting relationship the axial length at the flux gathering surface exceeds the axial length at the central portion of the core.

In order to accomplish the major objectives set forth in the above noted copending patent application, it is desirable that the laminated core structure have a minimized axial length at the central portion of the rotor or armature core compared to a maximized axial length at the flux exchanging region. One method of accomplishing this would be to arrange a plurality of suitably designed dissimilar lamina members in nesting relationship so that they may cooperate to define the desired structure. This approach of course is not feasible for mass produced structures which are, for example, assembled through automated assembly techniques. It is, therefore, an object of the present invention to provide a method of assembling a laminated rotor core structure for a dynamoelectric maching which may be assembled from a plurality of substantially identical lamina members and which results in an end structure having a substantially larger axial length at the flux exchanging region than is present at the central portion of the core. It is a still further object of the present invention to provide such an assembly technique which may be used to produce an end product having accurately controlled dimensions which does not necessarily require that the individual lamina members be accurately dimensioned.

SUMMARY OF THE PRESENT INVENTION

The present invention contemplates the provision of a plurality of individually formed lamina members which may initially take the appearance of a circular disc formed of a ferrous metal. The disc or lamina is then formed to provide a substantially circular central segment with a plurality of radially directed finger elements each terminating in a circumferentially directed flux gathering portion. Each of the radially directed finger elements is provided with an angular bend intermediate the flux gathering portion and the central segment. A plurality of these substantially uniform lamina or discs are then stacked in nesting relationship within the body cavity of a substantially cylindrical accurately dimensioned die and a ram member is arranged to compressively confine each of the lamina members within the die so that a predetermined axial length at the central portion of the core is obtained while the peripheral axial dimension may be controlled to achieve a predetermined or selected ratio between the peripheral axial dimension and the central axial dimension. In order to provide proper placement of the radially directed fingers of the lamina members, the ram may be provided with one or more axially directed guide members. In order to provide for the complete armature or rotor core element, a pair of composite laminated structures formed as set forth hereinabove may be arranged back-to-back on a common armature shaft. The conventional armature windings may thereafter be provided in the normal manner. By varying the number of individual lamina members arranged in the die prior to application of ram pressure, the overall size of the laminated structure may be varied to meet desired motor or dynamoelectric machine requirements.

BRIEF DESCRIPTION OF THE DRAWINGS

FIG. 1 shows an elevational view of a rotor lamina blank prior to any forming operation.

FIG. 2 shows an end view of the lamina blank of FIG. 1.

FIG. 3 illustrates a lamina member including the radially directed finger members which has been formed from the blank of FIGS. 1 and 2.

FIG. 4 shows a sectional view of the lamina member of FIG. 3 with the finger members bent to the initial angular position.

FIG. 5 shows a plurality of lamina members each according to the FIG. 4 embodiment arranged within the forming die immediately prior to application of ram pressure.

FIG. 6 illustrates the die and ram of FIG. 5 following a pressure application.

FIG. 7 illustrates the rotor structure produced by combining back-to-back two of the laminated structures produced by die and ram process illustrated in FIGS. 5 and 6.

DETAILED DESCRIPTION OF THE PREFERRED EMBODIMENT

Referring now to FIGS. 1 and 2, a substantially planar lamina blank 10 is illustrated. The lamina blank is a substantially circular body of ferrous material having a relatively thin axial dimension. This member or blank 10 may be formed by the usual process of stamping from a ribbon of ferrous material or may also be formed by any of the known metal formation techniques.

Referring now to FIG. 3, a substantially planar individual lamina member 12 having the desired lamina configuration has been formed from a blank 10 (of FIGS. 1 and 2) and includes a generally circular central segment 14 from which a plurality of radially directed finger elements 16 extend. Each finger element 16 terminates, at the remote free end thereof in a circumferentially directed flux gathering portion 18. It will be appreciated that the number of radially directed finger elements 16 is a function of the size of the dynamoelectric machine for which the end product, the composite laminated armature or rotor core structure, is desired and of the electromechanical properties of this dynamoelectric machine. Furthermore, the dimensions provided for the flux gathering portion 18, the radially directed finger elements 16 and the substantially circular central segment 14 will be a function of the magnetic flux which is to be generated by the core structure. These are well known design variables and are believed to be well within the skill of the man of ordinary skill in this art to adequately define with respect to the dynamoelectric machine for which the aramture or rotor core is intended. The step of forming the lamina members with the radially directed finger elements and the circumferentially directed flux gathering segments may be alternatively accomplished by stamping this form directly from a ribbon or strip of suitable ferrous material. The lamina 12 may also be formed by chemical or electrochemical etching techniques directly from a ribbon of ferrous material or from a circular blank 10. However, the use of the circular blank 10 is considered to be preferable since the total number of radially directed finger segments within an armature or rotor core may vary and a common blank 10 may suffice for a large number of contemplated armature lamina.

Referring now to FIG. 4, an axial sectional view of a lamina member 12 is shown. Each of the finger elements 16 has been provided with an angular bend 20 intermediate the flux gathering portion 18 and the central segment 14. The angular bend 20 is arranged to be at an angle of between 90° and 180° and preferably of about 135°. The steps of forming the radially directed finger elements 16 and flux gathering portions 18 and of bending the radially directed fingers to provide for the desired initial angularity may be combined in a single step of stamping the blank 10 according to FIG. 1 so that the metal is cut to form the radially directed fingers and also bent to provide the desired degree of angularity. It will, therefore, be understood that the step of forming a nestable lamina member comprises the steps of forming a suitable lamina blank, forming the lamina member into the desired lamina configuration and providing an initial angularity in the radially directed finger elements of the lamina member.

Referring now to FIG. 5, a die member 22 is illustrated having a central cavity 24. Die member 22 is comprised of a first substantially cylindrical member 26 and a second plate member 28. Central cavity 24 is provided within cylindrical member 26 and comprises a first or entry section 30, a second or final section 32 having a slightly smaller diameter than the entry section 30 and a cone surface 34 interconnecting the entry and final sections. Final section 32 defines, in cooperation with end plate 28, a substantially cup shaped forming region for formation of the composite laminated structure according to the present invention.

Ram member 36 is arranged to be reciprocated within die 22 and in particular within the shaped cavity 24. Ram member 36 includes an axially extending guide pin member 38. Guide pin member 38 is arranged to pass through the armature shaft hole provided at the center of each lamina member 12. Guide pin 38 is also arranged to be received within guide pin passage 40 of end plate 28. Ram 36 may also be provided with a plurality of guide members (not shown) which may be sized and spaced to pass between various ones of the radially directed finger elements 16 or the flux gathering portions 18 of the individual lamina to provide for proper alignment of these elements during the compressive assembly step. For convenience and clarity, these guides have been omitted from the FIG. 5 drawing. FIG. 5 also illustrates a plurality of lamina members 12 which have been placed in nesting relationship within the entry section 30 of the shaped cavity 24. The actual number of lamina members 12 inserted within the entry section 30 will depend upon the size of the rotary core being produced by this particular assembly. This size is a variable factor depending upon the overall dynamoelectric machine size and performance for which the composite laminated core is intended.

Referring now to FIG. 6, the die 22 and ram 36 of FIG. 5 are illustrated in a view showing the interrelation of the various parts immediately following a compression stroke of the ram 36. It can be seen that the individual lamina 12 have been forced leftward relative to FIGS. 5 and 6 into the final section 32 of the shaped cavity 24. This compression stroke has forced the individual lamina out of the entry section 30 so that the cone surface 34 has been operative to redefine the angular relationship between the radially remote portion of the finger segments 16 and the radially innermost portion of the finger segments 16 of each of the individual lamina. This redefinition has been operative in cooperation with the pressure exerted and the contour presented by the face 42 of ram 36 to provide a composite end assembly 44 in which each individual lamina has been forced to assume a configuration determined by the space available for that lamina. The composite laminated assembly thereby produced is a substantially solid structure whose exterior dimensions are defined by the dimensions of the final section 32 of the shaped cavity 24 and by the stroke and end configuration of ram 36. Furthermore, the axial dimension at the radially remote section is substantially greater than the axial dimension at the central section of the rotor member so that the flux gathering or flux exchanging area of the rotor or armature so produced is greatly increased with respect to the axial core length of the rotor. The pressure applied to the ram in order to achieve the desired compression will be a function of the properties of the material used in forming the lamina members 12, the number of lamina members 12 to be assembled into a composite end assembly 42 and the degree of metal deformation desired in the region of the flux gathering portions 18. By way of example, a composite end assembly 42 has been successfully formed by the method of the present invention having eight individual lamina members 12 each of which has ten finger elements 16 terminating in flux gathering portions 18. Each lamina member 12 was formed of a carbon steel having a thickness of about .048 inches. Application of ram pressure of about 30,000 p.s.i. produced a composite laminated structure having an axial thickness at the central segment of about .400 inches and an axial thickness at the flux gathering portion 18 of about .800 inches. The compression pressure of ram member 36 should be high enough to insure the desired deformation of the lamina members 12 and to provide some metal flow at the contact zone between the flux gathering portions 18 and the cylindrical member 26 of die 22. To provide adequate space for the metal flow, the circumference of each flux gathering portion 18 can be provided with a slightly flattened periphery.

With reference to FIG. 6, the guide pin 38 and the other pheripheral guides such as illustrated at 46 could be withdrawn into the body of the ram 36 and the end plate 28 could be moved away from cylindrical member 26. Further movement of the ram 36 leftward relative to FIGS. 5 and 6 could then force the composite laminated assembly 44 out of the die 22. Alternatively, the ram 36 could execute a withdrawal rightward from die 22 prior to movement of end plate 28 and an extracting ram, not shown, could remove the composite laminated assembly 44 from the cylindrical member 26 of die 22.

Referring now to FIG. 7, a flux producing core 46 of a dynamoelectric machine rotor or armature is illustrated. The rotor core 46 is formed by taking two composite laminated assemblies 44 formed in accordance with the FIG. 6 illustration and arranging these composite laminated assemblies back to back. These structures may be conveniently coupled by forcible insertion of an armature shaft 48 through a bore provided therefore centrally of the individual lamina members 12. The armature shaft may be provided with axially directed knurls or splines to aid in attaching the composite laminated assemblies 44 thereto. Following this assembly step, the rotor or armature 46 may be insulated by an epoxy coating, wound with conductive wire and balanced in the normal manner.

It can thus be seen that the present invention readily accomplishes its stated objectives. The initial blank member 10 and the subsequently formed individual lamina 12 need not be accurately sized or dimensioned since the final assembly step of compressively confining the individual lamina members within the die 22 will result in a composite laminated assembly whose dimensions are accurately controlled by the dimensions of the die and whose flux carrying capabilities would be determined solely as a function of the number of lamina initially placed within the die.

I claim:

1. The method of assemblying the flux producing core of a dynamoelectric machine armature having an axis of rotation and a generally cylindrical flux gathering surface concentric thereabout comprising the steps of:

forming a plurality of substantially identical nestable lamina members;

arranging a predetermined number of said lamina members in nesting relation within a die, said lamina members having flux gathering portions for defining the flux gathering surface, said flux gathering portions arranged to be substantially in contact with the side walls of the die, inserting a ram member within the die, applying compressive pressure to the ram and die members whereby the nesting stack of lamina member is compressively confined within the die forming a composite end assembly, and arranging two substantially identical end assemblies in back to back abutting relationship.

2. The method of claim 1 wherein the step of forming the plurality of nestable lamina members comprises the steps of:

forming a plurality of substantially planar lamina members each having a plurality of radially directed finger elements, and providing each of the finger elements with an axially directed angular bend of between 90° to 180°.

3. The method of claim 2 wherein the step of forming a plurality of planar lamina members comprises the steps of:

forming a plurality of substantially circular lamina blanks, and forming the desired lamina member configuration from said lamina blanks.

4. The method of claim 1 wherein the step of forming a plurality of nestable lamina members comprises:

stamping a plurality of lamina members, each having the desired lamina configuration, from a ribbon of ferrous material, said lamina configuration including a central segment and a plurality of generally radially directed finger elements, and concomitently providing each lamina member radially directed finger element with an axially directed angularity of between 90° and 180° intermediate the end thereof and the central segment of the lamina member.

* * * * *